April 2, 1963     A. THIBAULT     3,083,520

FRUIT PICKER

Filed Sept. 8, 1961

INVENTOR
Alphée THIBAULT

BY Pierre Lespérance

PATENT AGENT 3,083,520
FRUIT PICKER
Alphée Thibault, 3000 Jeanne D'Arc St., Apt. 12B,
Montreal, Quebec, Canada
Filed Sept. 8, 1961, Ser. No. 136,942
6 Claims. (Cl. 56—334)

The present invention relates to an apparatus or tool for picking fruits from trees in orchards.

The main object of the present invention resides in the provision of a fruit picker which enables the operator to detach the fruits from the trees while standing on the ground thereby eliminating the necessity of climbing in a ladder or the like to pick the fruits directly by hand.

Another important object of the present invention resides in the provision of a fruit picker of the character described which in a single operation, cuts the stem of the fruit, grasps the latter, and directs it into a basket or box on the ground in a gentle manner thereby avoiding any bruises to the fruit.

Another object of the present invention resides in the provision of a tool of the character described which is very fast in operation and therefore considerably accelerates the work of picking fruits in an orchard.

Another object of the invention resides in the provision of a tool of the character described which is of very simple and inexpensive construction, and which will have a long life.

The foregoing and other important objects of the present invention will become more apparent during the following disclosure and by referring to the drawings, in which.

Figure 1:
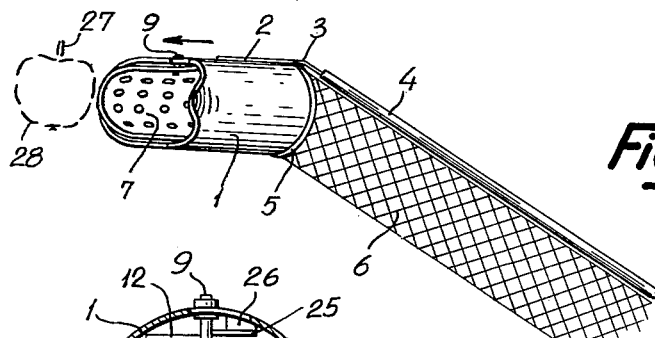
FIGURE 1 is a partial perspective elevation view of the tool of the invention.

Referring now more particularly to the drawings in which like reference characters indicate like elements throughout, a cylindrical casing 1 which is opened at both ends, is secured to a bar 2 bent at 3 and said bar is in turn secured to the one end of a long handle 4. The outlet end 5 of the casing 1 is in communication with a tubular flexible net 6 which extends along the handle 4 and is attached thereto at spaced points and which is opened at its lower end for the discharge of fruits into a basket, box, or the like, preferably resting on the ground. The net 6 will preferably have a free lower end portion extending beyond the handle 4. The outlet end 5 of casing 1 is preferably bevelled or inclined in order to facilitate the travel of the fruit from casing 1 into tubular net 6, the latter being at an angle to the casing 1.

A spoon-like member 7 of generally half spherical shape is mounted for pivotal movement within the inlet end portion of casing 1. Spoon 7 may be made of thin sheet metal with spaced perforations 8 or simply by intersecting metal strips. Spoon 7 is pivotally connected to the casing 1 by means of pivots 9 and 10 which are diametrically opposed and which are located adjacent the edge of the inlet end of casing 1 and the edge of the spoon mouth.

Spoon 7 has a flattened portion 11 substantially coaxial with and surrounding pivot pin 9 and on this flattened portion 11 is secured a knife blade 12 which defines an edge portion of the spoon mouth and is somewhat recessed at an angle with respect to the pivot pin 9. Knife blade 12 lies therefore in a plane perpendicular to the pivotal axis of the spoon. The side portion of the spoon provided with the knife blade 12 forms a forwardly projecting portion 13 with respect to the plane which would continue the edge portion 14 to define a half sphere. The inlet end of casing 1 is defined by a substantially straight edge portion 15, inclined edge portion 16 which just surround the pivot pin 10, while the opposite side of the casing is formed by a projecting portion 17 the edge of which on the side of the pivot pin 9 forms a deep notch 18 just adjacent pivot pin 9.

A tension coil spring 19 is attached to the spoon at 20 at a point spaced from pivot pin 9 and to the inside of the casing at 21 in alignment with pivot pin 9 and near the outlet end 5 of casing 1. A flexible rope 22 is attached at 23 to the outside of spoon 7 at a point opposite the half portion of the spoon provided with the knife blade 12 and in a plane at right angles to the axis of rotation and intersecting the center of said axis. Rope 22 freely surrounds the outside of the spoon and is trained over a pulley 24 mounted on casing 1 in a notch thereof at a point diametrically opposite the point of attachment 23 of rope 22 to spoon 7 in the rest position of the spoon 7. The rope then is extended alongside handle 4 to terminate at a position readily accessible to the operator. The rope may be passed through spaced eyelets secured along the handle 4.

Figure 2:
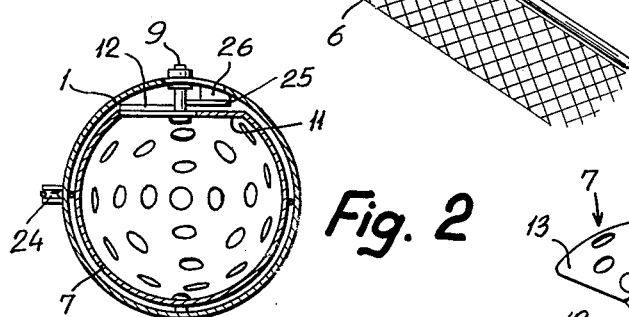
FIGURE 2 is a cross-section view rotated 180 degrees of the tool taken on line 2—2 of FIGURE 4.
Figure 3:
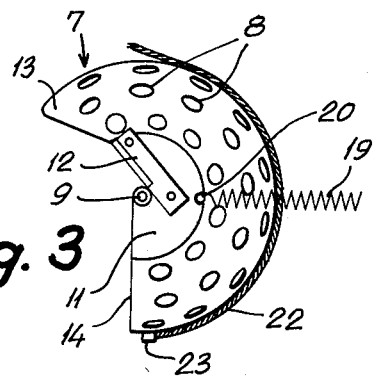
FIGURE 3 is an enlarged top plan view of the spoon.

A second stationary knife blade 25 is secured to casing 1 inside thereof with its knife edge coinciding with the edge portion of the casing defining the notch 18. Knife blade 25 is in a plane parallel to the plane of knife blade 12 and is adapted to coact with blade 12 in a scissor-like action. Knife blade 25 is maintained in secured position by bracket 26, as shown in FIGURE 2.

Figure 4:
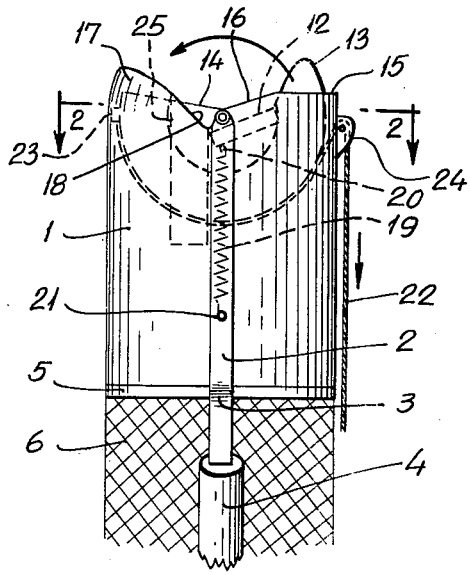
FIGURE 4 is an enlarged partial top plan view of the tool in open fruit receiving position.
Figure 5:
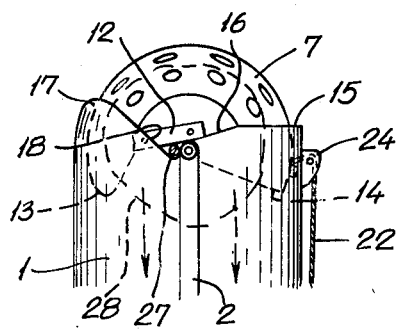
FIGURE 5 is an enlarged partial plan view similar to that of FIGURE 4, but showing the spoon in closed position about to cut the stem of a fruit already enclosed by the spoon.

The tool of the invention operates as follows: In its rest position, the spoon opens the inlet end of casing 1 as shown in FIGURE 4. The spoon is rigidly maintained in opened position due to the action of spring 19, the attachment point 20 of said spring being nearer to the attachment point 21. The tool is presented to a fruit to be cut by embracing the fruit with the opened spoon 7 with pivot pin 9 in topmost position. Rope 22 is then pulled by the operator whereby the spoon 7 rotates about its pivot pins 9 and 10 through slightly less than half a circle; this traps the fruit within the casing and at the end of the travel of the spoon, knife blade 12 comes in contact with the stem 27 of the fruit 28 and cuts said stem adjacent the pivot pin 9 due to the scissor action of knife blade 12 with knife blade 25. The stem 27 of the fruit 28 is thus cut and the fruit 28 moves under gravity down the inclined casing 1 and down through the tubular net 6 to be discharged in a suitable receptacle. Upon release of rope 22, the spoon 7 automatically returns to its opened position with its mouth facing outwardly of the inlet end of casing 1 under the return action of coil spring 19, the latter having been elongated during the swinging movement of the spoon.

It should be noted that the knife blades 12 and 25 are located adjacent the pivot pin 9 whereby a good leverage is obtained for easily cutting the stem of the fruit, the rope 22 being attached at 23 to a point radially outwardly spaced from the zone of cutting of the knife blades.

The tool is always presented to the fruit with the pivot pin 9 and adjacent knife blades 12 and 25 in topmost position, such that the fruit hangs freely and enters the mouth of the opened spoon. The fruit once cut will move gently down the casing 1 and net 6 and will not become bruised. The device is very easy and quick to operate.

While a preferred embodiment in accordance with the present invention has been illustrated and described, it is understood that various modifications may be resorted to without departing from the spirit and scope of the appended claims.

What I claim is:

1. A fruit picker comprising a casing opened at both ends defining an inlet end and an outlet end, a spoon of generally half spherical shape defining a mouth, said spoon pivoted within said casing at the inlet end thereof, and adjacent the mouth of said spoon, and pivotable between an opened position in which the mouth of said spoon faces outwardly of said casing for receiving a fruit, and a closed position in which the mouth of said spoon faces inwardly within said casing for discharing the fruit into said casing, a first knife blade secured to said spoon along the mouth thereof adjacent the pivot connection of said spoon to said casing, and a second knife blade secured to said casing adjacent the inlet end thereof and adjacent said pivot connection and coacting with said first knife blade to cut the stem of a fruit upon swinging closing movement of said spoon around a fruit, said first and second knife blades being disposed in planes substantially perpendicular to the pivotal axis of said spoon, spring means interconnecting said spoon and said casing for resiliently maintaining said spoon in opened position and manually operable pull rope means attached to said spoon for closing the latter.

2. A fruit picker as claimed in claim 1, wherein said spoon is pivoted in said casing at two diametrically opposed points by means of pivot pins, said knife blades being disposed adjacent one of said pivot pins, said spoon having a flattened portion surrounding said one pivot pin and on which said first knife blade is secured, such that said first knife blade travels in a plane perpendicular to the pivotal axis of said spoon in the swinging movement of the latter, said second knife blade being mounted in a plane parallel to the plane of movement of said first knife blade to coact with the latter in a scissor-like action during swinging movement of said spoon.

3. A fruit picker as claimed in claim 1, wherein said spring means comprise a tension spring disposed within said casing and attached to said spoon adjacent said first knife blade and to the casing at a point spaced inwardly from the inlet end thereof.

4. A fruit picker as claimed in claim 1, wherein said pull rope means comprise a pull rope attached to said spoon at a point spaced from the pivotal connections of said spoon to said casing and freely surrounding said spoon, and a pulley mounted on said casing near the inlet end thereof and on which said rope is trained.

5. A fruit picker as claimed in claim 2, wherein said casing has an elongated tubular shape and further including a handle to one end of which said casing is secured and a tubular discharge net extending alongside and secured to said handle and having one end in communication with the outlet end of said casing, said handle having a bent portion adjacent said casing whereby the major portion of said handle is inclined with respect to the longitudinal axis of said casing.

6. A fruit picker as claimed in claim 1, wherein the edge of the inlet end of said casing forms a deep notch adjacent the pivotal connection of said spoon to said casing for receiving the stem of a fruit, said second knife blade having its cutting edge substantially coinciding with the edge of said notch.

References Cited in the file of this patent

FOREIGN PATENTS 103,848    Germany _____ June 22, 1899